(12) United States Patent
Sherriff et al.

(10) Patent No.: US 7,680,970 B2
(45) Date of Patent: Mar. 16, 2010

(54) METHOD AND SYSTEM FOR BATCH PROCESS ARBITRATION IN A PROCESS CONTROL SYSTEM

(75) Inventors: Godfrey R. Sherriff, Austin, TX (US); Nathan W. Pettus, Georgetown, TX (US); William G. Irwin, Austin, TX (US); Grant Wilson, Austin, TX (US); David L. Deitz, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 10/972,192

(22) Filed: Oct. 22, 2004

(65) Prior Publication Data

US 2006/0089739 A1 Apr. 27, 2006

(51) Int. Cl.
*G06F 12/00* (2006.01)
*G06F 13/14* (2006.01)
*G06F 13/38* (2006.01)
*G05B 11/01* (2006.01)
*G06F 19/00* (2006.01)
*G06F 9/46* (2006.01)
*G06F 17/00* (2006.01)
*G05B 21/00* (2006.01)

(52) U.S. Cl. .................. 710/240; 710/242; 700/19; 700/20; 700/99; 718/104

(58) Field of Classification Search .......... 710/240–244; 700/99, 19, 20, 239, 265; 718/104
See application file for complete search history.

(56) References Cited

U.S. PATENT DOCUMENTS

| 5,303,391 | A | * | 4/1994 | Simcoe et al. ............... 710/240 |
| 5,414,845 | A | * | 5/1995 | Behm et al. .................. 718/104 |
| 5,491,625 | A | * | 2/1996 | Pressnall et al. ............... 700/4 |
| 6,014,612 | A | * | 1/2000 | Larson et al. ............... 702/183 |
| 6,065,102 | A | * | 5/2000 | Peters et al. .................. 711/151 |
| 6,192,281 | B1 | * | 2/2001 | Brown et al. .................... 700/2 |
| 6,347,352 | B1 | * | 2/2002 | Jeddeloh et al. ............. 710/243 |
| 6,411,815 | B1 | * | 6/2002 | Balasuriya .................. 455/512 |

(Continued)

FOREIGN PATENT DOCUMENTS

DE    4443617 A1 *  6/1996

(Continued)

OTHER PUBLICATIONS

Pleinevaux, P.; Decotignie, J.-D., "Time critical communication networks: field buses," Network, IEEE, vol. 2, No. 3, pp. 55-63, May 1988.*

(Continued)

*Primary Examiner*—Mark Rinehart
*Assistant Examiner*—Faisal M Zaman
(74) *Attorney, Agent, or Firm*—Marshall, Gerstein & Borun LLP

(57) ABSTRACT

A method and system for equipment arbitration in a process control system are presented. The method and system include receiving a request for a first resource associated with a first area from a first resource user associated with a second area where the first and second areas are distinct. The method and system automatically determine whether the first resource is available for use by the first resource user.

40 Claims, 5 Drawing Sheets

U.S. PATENT DOCUMENTS

| | | | |
|---|---|---|---|
| 6,522,934 B1 * | 2/2003 | Irwin et al. | 700/11 |
| 6,694,345 B1 * | 2/2004 | Brelsford et al. | 718/100 |
| 7,047,370 B1 * | 5/2006 | Jeter et al. | 711/154 |
| 7,058,712 B1 * | 6/2006 | Vasko et al. | 709/224 |
| 7,151,966 B1 * | 12/2006 | Baier et al. | 700/19 |
| 7,228,351 B2 * | 6/2007 | Arwe | 709/226 |
| 2002/0035465 A1 | 3/2002 | Sinclair | |
| 2003/0100957 A1 | 5/2003 | Chaffee et al. | |
| 2003/0135678 A1 * | 7/2003 | Andre | 710/243 |
| 2003/0140087 A1 * | 7/2003 | Lincoln et al. | 709/201 |
| 2004/0176864 A1 | 9/2004 | Cocco et al. | |
| 2005/0038557 A1 * | 2/2005 | Friel et al. | 700/233 |
| 2005/0065626 A1 * | 3/2005 | Kappelhoff et al. | 700/97 |
| 2005/0228523 A1 * | 10/2005 | Heminway et al. | 700/100 |
| 2006/0030962 A1 * | 2/2006 | Hofferl et al. | 700/101 |
| 2006/0031619 A1 * | 2/2006 | Nguyen et al. | 710/305 |
| 2006/0047873 A1 * | 3/2006 | Bose et al. | 710/243 |
| 2006/0179438 A1 * | 8/2006 | Jackson | 718/104 |
| 2007/0022425 A1 * | 1/2007 | Jackson | 718/104 |
| 2007/0143765 A1 * | 6/2007 | Aridor et al. | 718/104 |

FOREIGN PATENT DOCUMENTS

| | | |
|---|---|---|
| EP | 1 507 183 A2 | 2/2005 |
| EP | 1519254 A1 * | 3/2005 |

OTHER PUBLICATIONS

Feng Xia; Xiaohua Dai; Zhi Wang; Youxian Sun, "Feedback based network scheduling of networked control systems," Control and Automation, 2005. ICCA '05. International Conference on , vol. 2, No., pp. 1231-1236 vol. 2, Jun. 26-29, 2005.*

El Guibaly, F., "Design and analysis of arbitration protocols," Computers, IEEE Transactions on , vol. 38, No. 2, pp. 161-171, Feb. 1989.*

Stengel, R.F., "Intelligent failure-tolerant control," Control Systems Magazine, IEEE , vol. 11, No. 4, pp. 14-23, Jun. 1991.*

Search Report under Section 17(5) issued in GB0520914.3 application by United Kingdom Patent Office on Mar. 7, 2006.

Office Action for Philippines Patent Application No. 12005000508, dated Jan. 28, 2009.

* cited by examiner

FIG. 4

BATCH EXECUTIVE

| ID | TYPE |
|---|---|
| RESOURCE$_1$ | LOCAL |
| RESOURCE$_2$ | GLOBAL |
| ... | ... |
| RESOURCE$_N$ | LOCAL |

GLOBAL EQUIPMENT ARBITRATOR 114

| RESOURCE ID | GAR ID | VOTING WEIGHT |
|---|---|---|
| RESOURCE$_1$ | GEA$_1$ | 0.7 |
| RESOURCE$_1$ | GEA$_2$ | 1.0 |
| RESOURCE$_1$ | CUSTOMER$_1$ | 2.0 |
| ... | ... | ... |

150, 260, 262, 270, 250

METHOD AND SYSTEM FOR BATCH PROCESS ARBITRATION IN A PROCESS CONTROL SYSTEM

TECHNICAL FIELD

The present disclosure generally relates to process control systems and, more particularly, to batch process arbitration.

BACKGROUND

As computers have grown increasingly important in today's society, so has the importance of computers in process control systems. Process control systems control and monitor the operation of valves, actuators, transmitters, flowmeters, and other process control and monitoring devices.

Factories and other production plants are commonly used to create a variety of products. Process control systems, such as those provided by Emerson Process Management, LLP, of Austin, Tex., are widely used in such factories and/or plants in which products are manufactured or processes are controlled (e.g., chemical manufacturing, power plant control, etc.). Process control systems are also used in the harvesting of natural resources such as, for example, oil and gas drilling and handling processes, etc. Virtually any manufacturing process, resource harvesting process, etc. can be automated through the application of one or more process control systems.

Another common manufacturing process controlled by process control systems is a batch process. Batch processing typically involves recipes for creating materials. For example, batch processing is commonly used in the pharmaceutical and chemical industries to manufacture drugs and other substances. The recipe describing a batch process typically indicates how to make the desired substance. For example, a particular pharmaceutical may be created by first mixing two chemicals and then heating the mixture. The total recipe may contain hundreds of steps for creating just one substance. The recipe may indicate what materials to use and in what proportions, whether to heat or cool the materials and what equipment is needed to produce the desired substance.

Batch processing often involves managing the use of devices at a plant as the recipes are being executed. The complexity of managing such systems has traditionally prevented the process control system from globally managing all of the devices involved in performing the recipes as the large number of devices can overload the processing capabilities of the process control system.

SUMMARY

In general, manufacturing plants are often logically separated into distinct groups of equipment known as areas so as to avoid overloading the processing capabilities of the batch control system by requiring the process control system to simultaneously manage access by recipes to large numbers of devices. Each area would include certain devices and often would be designated for certain operations. Traditionally, the batch control system would only protect equipment from simultaneous use by other equipment within that same area.

In one embodiment, a method and system for equipment arbitration in a : process control system is presented. The method and system involve receiving a request for a first resource associated with a first area from a first resource user associated with a second area. The second area is distinct from the first area and automatically determining whether the first resource is available for use by the first resource user.

The present disclosure provides various technical advantages. Various embodiments may provide all, some or none of these technical advantages. One such technical advantage is the capability to manage access to devices for recipe execution across multiple areas. By allowing automatic management of device access across multiple areas, plant efficiency may be increased.

BRIEF DESCRIPTION OF THE DRAWINGS

FIG. 4 is a block diagram illustrating further details of a batch executive used to execute recipes according to one embodiment of the present disclosure;

FIG. 5 is a block diagram illustrating details of one embodiment of global equipment arbitrators that includes voting and voting priorities.

DETAILED DESCRIPTION

Process control systems are often used in a variety of industries to control and monitor the operation of various devices at an industrial plant. One type of industrial plant that uses process control systems are pharmaceutical manufacturing facilities. Pharmaceutical manufacturing facilities use batch processing techniques to generate large quantities of a particular substance, such as a drug, through a step-by-step process. In contrast to continuous processing techniques, such as those used for controlling the flow of natural gas through a refinery, batch processing techniques involve a series of discrete, ordered steps, such as a recipe specifying fifteen separate steps for creating a pharmaceutical. Each step may require the use of one or more pieces of equipment, such as heaters, conveyer belts, tanks, mixers, etc.

A particular plant may also have multiple batch recipes running substantially in parallel. For example, one recipe may require the use of a mixing vat while another recipe involves heating in a storage container. The parallel recipes have to be coordinated to prevent multiple recipes from trying to simultaneously use the same equipment. The process control system has traditionally managed the allocation of equipment to recipes so that recipes do not ruin each other by simultaneously trying to use the same equipment, such as by preventing the addition of one substance in a mixing vat while another substance is being mixed.

Typically, the manufacturing plants are logically separated into distinct groups of equipment known as "areas" so as to avoid overloading the processing capabilities of the batch control system. Each area would include certain equipment and often would be designated for certain operations. The batch control system would only protect equipment from simultaneous use by other equipment within that same area. Thus, if a recipe required equipment from multiple areas, the operator of the batch control system had to monitor the ongoing processes so that simultaneous use of a single piece of equipment by different on-going recipes did not occur.

The present disclosure, in at least one embodiment, allows for management of equipment across multiple areas of the plant. The equipment is marked as being used locally within a particular area, or as being used globally across multiple areas. Often, only certain pieces of equipment are needed across multiple areas, and, by marking whether a piece of equipment is used locally or globally, the process control system can manage the equipment across the areas while not being overburdened by monitoring large amounts of equipment that are used only within that equipment's area.

Figure 1:
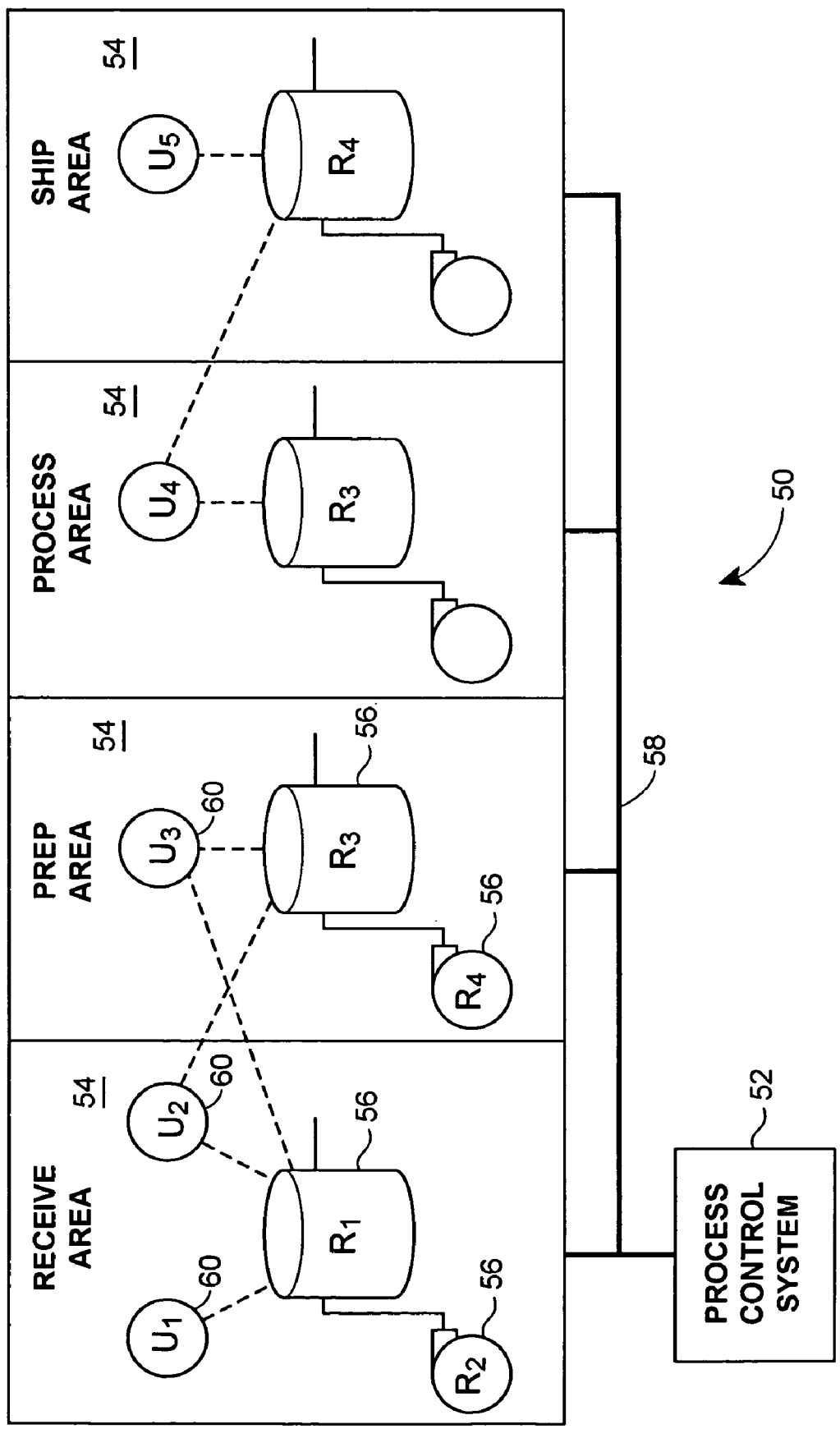
FIG. 1 is a block diagram illustrating a process control system in a manufacturing plant according to one embodiment of the present disclosure.

FIG. 1 illustrates an integrated process control system according to one embodiment of the present disclosure. In particular, as illustrated in FIG. 1, a process plant 50 includes a process control system 52, one or more areas 54, one or more resources 56, a communications network 58 and one or more resource users 60. The process plant 50 may comprise a pharmaceutical manufacturing or production facility, a refining or other chemical processing operation, or other suitable batch or continuous process environments. In the disclosed embodiment, the process plant 50 uses at least one batch processing technique.

The process control system 52 may comprise hardware and/or software operable to control, command, monitor, test, communicate with and/or otherwise use the resources 56 over communications network 58. For example, the process control system 52 may be the DeltaV™ system sold by Emerson Process Management, LLP, of Austin, Tex. In general, the process control system 52 controls access to the resources 56 and schedules use of the resources 56 by resource users 60. The communications network 58 supports data communication between the process control system 52, areas 54, resources 56 and resource users 60, and may be implemented using, either alone or in various combinations, any desired bus-based and/or non-bus based hardware, using any desired hardwired and/or wireless communication structure or other suitable communication protocol, such as the Ethernet, Foundation Fieldbus or Profibus protocols.

The areas 54 represent a logical and/or physical organization of the process plant 50, the resources 56 and the resource users 60. In a batch processing environment, a final or desired product is typically created using a series of steps known as a recipe. The areas 54 are generally used to organize resources 56 used in performing the steps of the recipes used in the plant 50. The organization of the areas 54 may be based on the physical location of the resources 56 in the plant 50, a logical organization of the resources 56 in the plant 50, or a combination of the physical and logical organization of the resources 56 as suitable. For example, a batch processing operation may be broken up into separate areas 54 for receiving, preparation, processing and shipping. Continuing the previous example, raw materials for a pharmaceutical creation process may be received in a receiving area, changed in a preparation area, combined and processed to create the target pharmaceutical in a process area, with the target pharmaceutical then being packaged and shipped from a shipping area. The resources 56 in the areas 54 may be used as part of the production of different types of end products, such as various equipment used to create different pharmaceuticals. In one embodiment, the areas 54 also provide a practical solution to the problem of having too many resources 56 and resource users 60 for system 52 to handle as a single group. The areas 54 may be used to split up the processing of large recipes so that the process control system 52 is not slowed by being required to manage a large number of resources 56 while performing other process monitoring duties. For example, the processing capabilities of the control system 52 may be overwhelmed due to the large number of interactions to be managed across the entire plant 50, and dividing the entire plant 50 into separate areas 54 decreases the number of interactions.

The resources 56 may respectively comprise a valve, tank, pump, conveyer belt, mixer, heater, or other suitable device usable as part of the processes performed in plant 50. The resources 56 may, at various times, be used in different portions of the batch process by different resource users 60. For example, a particular heater resource 56 may be used with a first substance for one end product, cleaned, and then later used with a second substance for a different end product.

The resource users 60 represent physical or logical entities that use the resources 56. For example, a user 60 may represent a particular recipe being executed by the process control system 52 that uses the resources 56 in a particular order to produce a particular product. The resource users 60 may themselves be resources 56. For example, a pump resource may act as a resource user when requesting access to a tank resource so that the pump resource can fill the tank resource with a particular material. Further, the resource user 60 may represent materials used as part of the production process itself, such as raw materials. For example, a first substance currently being stored in a tank may request access to a pump to move the first substance to a heater as part of a recipe. Also, a resource user 60 may be a human or other entity not directly controlled by the process control system 52, but that may request access to the resources 56 from the process control system 52. In general, the resource user 60 may be human, material, hardware, software and/or other resource 56 used by the plant 50 to produce products under the control of the process control system 52.

In operation, one or more human users (not shown) may configure, control and monitor the execution of one or more recipes, batch processes or other processes using the process control system 52. The recipes are performed using the resources 56 available at the process plant 50 to generate one or more desired end-products. The process control system 52 is responsible for controlling access to resources 56 by resource users 60 so that two users 60 do not attempt to use the same resource 56 simultaneously. Simultaneous use of the same resource 56 for different recipes may cause contamination of the materials being processed and may require that the products be discarded, or have other negative results. The process control system 52 controls access to the resources 56 by arbitrating between requests from users 60 to use the resources 56 as is described in more detail in association with FIG. 2.

Figure 2:
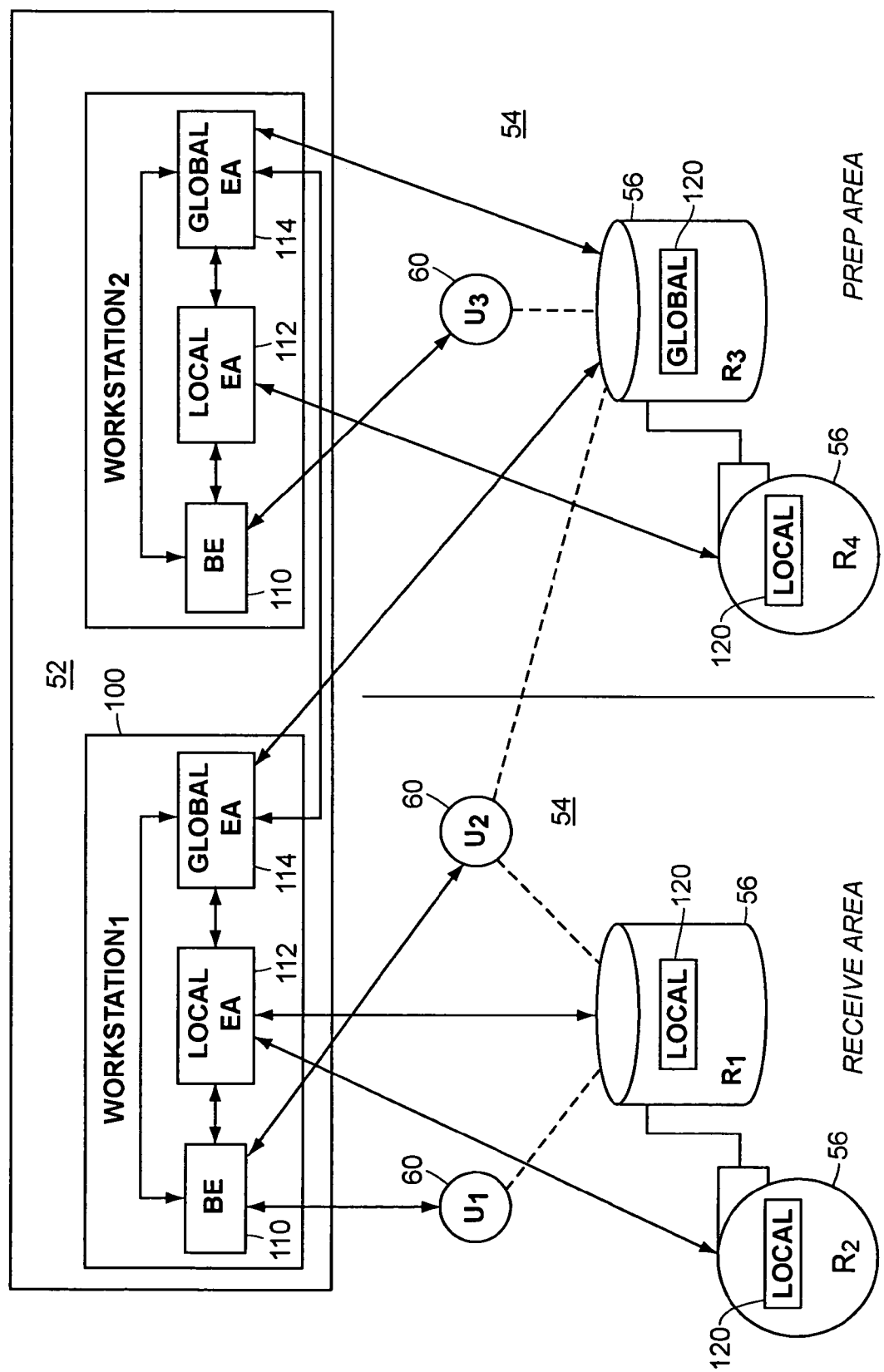
FIG. 2 is a block diagram illustrating further details of the plant and the process control system according to one embodiment of the present disclosure.

FIG. 2 is a block diagram illustrating further details of the plant 50 and the process control system 52. The process control system 52 further comprises one or more workstations 100 and the resources 56 further comprise a type 120.

A respective type 120 is associated with each resource 56 and indicates whether the resource 56 is used only in a single area 54, or across multiple areas 54. In one embodiment, the type 120 is either "local" or "global". The local type 120 indicates that the resource 56 is used in only one area 54, while the global type 120 indicates that the resource 56 is used across multiple areas 54. By designating whether a resource 56 is needed in only one area 54 or across multiple areas 54, multi-area equipment arbitrators can manage simultaneous or competing requests for the same resource 56 from users 60 across multiple areas 54 without having to manage all resources 56. In one embodiment, the determination of whether a particular resource 56 is local or global is performed by a human operator or engineer associated with the plant 50.

The workstations 100 may comprise hardware and/or software, such as monitors, keyboards, central processing units (CPUs), computer readable memory and storage, operable to provide process control services. For example, the workstations 100 may be computer workstations or personal computers (PCs) running the Microsoft® Windows NT, 2000 or XP® operating systems on Intel® Corp. computer processors. For another example, the workstations 100 may include electronic memory, such as random access memory (RAM), dynamic RAM (DRAM) and read-only memory. (ROM), magnetic and optical storage, such as hard drives, floppy disk drives, CD-ROM drives, CD-RW drives and digital versatile disk (DVD) drives, and other suitable computer components.

The workstations 100 may further comprise batch process control capabilities, such as the DeltaV™ Batch software sold by Emerson Process Management as part of the DeltaV™ system. In one embodiment, the workstations 100 further comprise a batch executive 110, a local equipment arbitrator (LAR) 112, and a global equipment arbitrator (GAR) 114.

The batch executive 110 comprises software stored on a computer readable medium and operable to perform the batch processing portion of the process control system 52 for one or more areas 54. In one embodiment, each respective area 54 is controlled by a separate batch executive 110. The batch executive 110 controls the resources 56 and resource users 60 that perform the steps of the recipes used at the plant 50. For example, the batch executive 110 may control a heater resource to heat a substance for 15 minutes at 350 degrees F and then decant the heated substance into a mixer resource. The batch executive 110 may be controlling the performance of multiple recipes substantially simultaneously and/or in parallel with each other. The batch executive 110 communicates with the LAR 112 and GAR 114 to handle requests for resources 56 by users 60.

LAR 112 comprises software stored on a computer readable medium and/or hardware operable to communicate with the batch executive 110 to arbitrate conflicting requests for use of resources 56 by users 60 within a particular area 54. More specifically, as the batch executive 110 is performing recipes using resources 56, two or more users 60 may require the use of the same resource 56 at substantially the same time. If the batch executive 110 allows both users 60 to use the same resource 56 at substantially the same time, both recipes may be ruined. Similarly, as part of a recipe, the batch executive 110 may determine that one or more resources 56 may need to be reserved in the future for time sensitive steps in a recipe, or that a particular resource 56 must be prepared prior to use in a particular recipe, such as a resource 56 that requires cleaning. Prior to allocating or reserving one or more resources 56 to a user 60, the batch executive 110 requests use of the resource 56 from the LAR 112. LAR 112 determines whether the requested resource 56 is available for use by the batch executive 110 within the batch executive's particular area 54. In one embodiment, LAR 112 only handles resources 56 with a type 120 of "local".

GAR 114 comprises software stored on a computer readable medium and/or hardware operable to communicate with the batch executive 110 to arbitrate conflicting-requests for use of resources 56 by users 60 across two or more areas 54. More specifically, as the batch executive 110 is performing recipes using resources 56, two or more recipes may require the use of the same resource 56 at substantially the same time. Prior to allocating or reserving one or more resources 56 to a recipe, the batch executive 110 may request use of the resources 56 in different areas 54 from the GAR 114. GAR 114 determines whether the requested resource 56 is available for use by the batch executive 110 outside of the batch executive's particular area 54. In one embodiment, GAR 114 only handles resources 56 with a type 120 of "global". GARs 114 are capable of communicating with each other in order to resolve requests for resources 56.

In one embodiment, a respective GAR 114 is associated with each respective batch executive 110 and is responsible for the resources 56 with a type 120 of global in that batch executive's particular area 54. A second GAR 114 in a different area 54 requests the resource 56 from the GAR 114 associated with the area 54 having the requested resource 56. For example, referring to FIG. 2, user U2 may request access to resource R3. Since U2 is in a different area from R3, the GAR 114 in U2's area will request access to R3 from the GAR 114 in R3's area.

Also, in one embodiment, the GARs 114 may be operable to handle failure of another GAR 114 by taking over resources 56 handled by the failed GAR 114. For example, the GAR 114 in a first area may fail and the GAR 114 in a second area may take over resource arbitration for the resources 56 in the failed GAR's area.

In operation, one or more batch executives 110 control the performance of one or more recipes in each of one or more areas 54. Various resource users 60 may request access to one or more resources 56 in order to perform steps of the recipes. The resource users 60 request access to the resources 56 through the batch executive 110. The batch executive then passes the requests for resources 56 to the LAR 112 or GAR 114 associated with the batch executive based on the type 120 of the resource 56 being requested.

When the type 120 of the requested resource 56 is local, the LAR 112 determines whether the resource 56 is available for use by the user 60 based on suitable criteria. For example, the LAR 112 may simply determine whether the resource 56 is currently being used by another user 60. The LAR 112 may also perform complex usage determinations, such as whether resource 56 needs to be cleaned, such as by clean-in-place systems, prior to being used by user 60 or that resource 56 needs to be at a certain temperature prior to being used by the requesting user 60. The LAR 112 then communicates whether, and optionally when, the requested resource 56 is available to batch executive 110. For example, if users U1 and U2 attempt to access resource R1, then the LAR 112 will decide which user gets access to the requested resource.

When the type 120 of the requested resource 56 is global, the GAR 114 determines whether the resource 56 is available for use by the requesting user 60. If the requested resource 56 is in the same area as the GAR 114 associated with the batch executive 110, the GAR 114 determines whether the resource is available and communicates whether the requested resource is available to the batch executive 110. If the requested resource 56 is in a different area from the GAR 114 associated with the batch executive 110, the GAR 114 communicates the request to the GAR 114 having the requested resource 56 in its area 54. The requesting GAR 114 may determine the appropriate GAR 114 to handle the request using any suitable method. In one embodiment, the GARs 114 are organized as peers in a peer-to-peer network configuration where requests are broadcast to all or a portion of the GARs 114 and is handled by the appropriate GAR 114. In another embodiment, the GARs 114 may again be organized as peers, but exchange lists of handled resources 56 and avoid the need to broadcast the request to all GARs 114. Instead, the appropriate GAR 114 could be contacted directly by the requesting GAR 114. In general, the GARs 114 may be organized in any suitable manner. The appropriate GAR 114 determines whether the requested resource 56 is available and communicates the result back to the requesting GAR 114. The requesting GAR 114 then passes the result back to the batch executive 110 for handling. Alternatively, the requesting GAR 114 may be bypassed and the result sent directly back to the requesting batch executive 110. For example, referring to FIG. 2, if user U3 is currently using resource R3 and user U2 wishes to access resource R3, the GAR 114 in U2's area will pass U2's request to the GAR 114 in R3's area for handling.

The batch executive 110 then handles whether the requested resource 56 is available. For unavailable resources, batch executive 110 may take suitable action, such as pausing the execution of the recipe associated with the requesting user 60.

In one embodiment, the GARs 114 may select a master GAR from all or a portion of the GARs 114 provided by the process control system 52. Any suitable GAR 114 may act as the master GAR. For example, the master GAR may be restricted to GARs 114 running on workstations 100 that have a certain amount of processing power or less than a certain amount of processing load. The master GAR may act as a centralized database for tracking whether particular resources 56 are available, what resources 56 are in what areas 54 and/or provide other suitable data. A master GAR may be used to decrease the amount of communication needed between GARs 114 by storing the mapping between resources 56 and the GAR 114 assigned to handle that resource 56. In another embodiment, the master GAR may store status information, such as availability, for resources 56. In this embodiment, the requesting GAR 114 could query the master GAR to determine whether a resource 56 is available. The selection of the master GAR may be performed using any suitable techniques. For example, the GARs 114 may elect a master GAR by determining which GAR 114 was first activated. Other techniques for electing or selecting "master" elements in a network are well known in the art.

The GARs 114 may also be capable of handling the failure of other GARs 114. More specifically, the GAR 114 in a particular area 54 may fail, such as by crashing. Another GAR 114 may detect such a failure and take over handling of the failed GAR's resources 56. For example, the master GAR may detect a failure and assign another GAR 114 to the failed GAR's resources 56. For another example, a requesting GAR 114 may detect that another GAR 114 has failed to respond for some period of time and take over the resources 56 handled by the failed GAR 114.

In another embodiment, the GARs 114 may collectively determine whether a user 60 may use a particular resource 56. For example, in contrast to having the GAR 114 in each area 54 be responsible for handling access to resources 56 in that area 54, two or more GARs 114 may be responsible for handling access to one or more resources 56 in one or more areas 54. In general, some or all of the GARs 114 may be responsible for handling access to some or all of the resources 56 in the areas 54 as suitable. For example, further types 120 may be defined to determine how availability of a particular resource 56 is handled by the GARs 114. Collective determination of the availability of resources 56 may be based on voting by the GARs 114 or by other suitable techniques. Also, collective determination may allow particular GARs 114 to have priority in determining the availability of particular resources 56. For example, a first GAR may get more votes than, or a veto power over, one or more second GARs. Further, the increased voting power or veto ability of one or more GARs 114 may be based on the particular resources 56 being requested. Giving a GAR 114 increased voting power or a veto power may provide the ability to allow priority use of resources 56 in particular situations. For example, an emergency or an unexpected result may require priority access be given to certain users 60. FIG. 5 illustrates GARs with voting capabilities in greater detail.

In one embodiment, one advantage of associating types with the resources can is that resources may be managed across multiple areas without overloading the process control system. By allowing automatic management of the resources across multiple areas, plant efficiency may be increased by decreasing the need for human operator intervention in the process which may lead to decreased costs for the plant.

Figure 3:
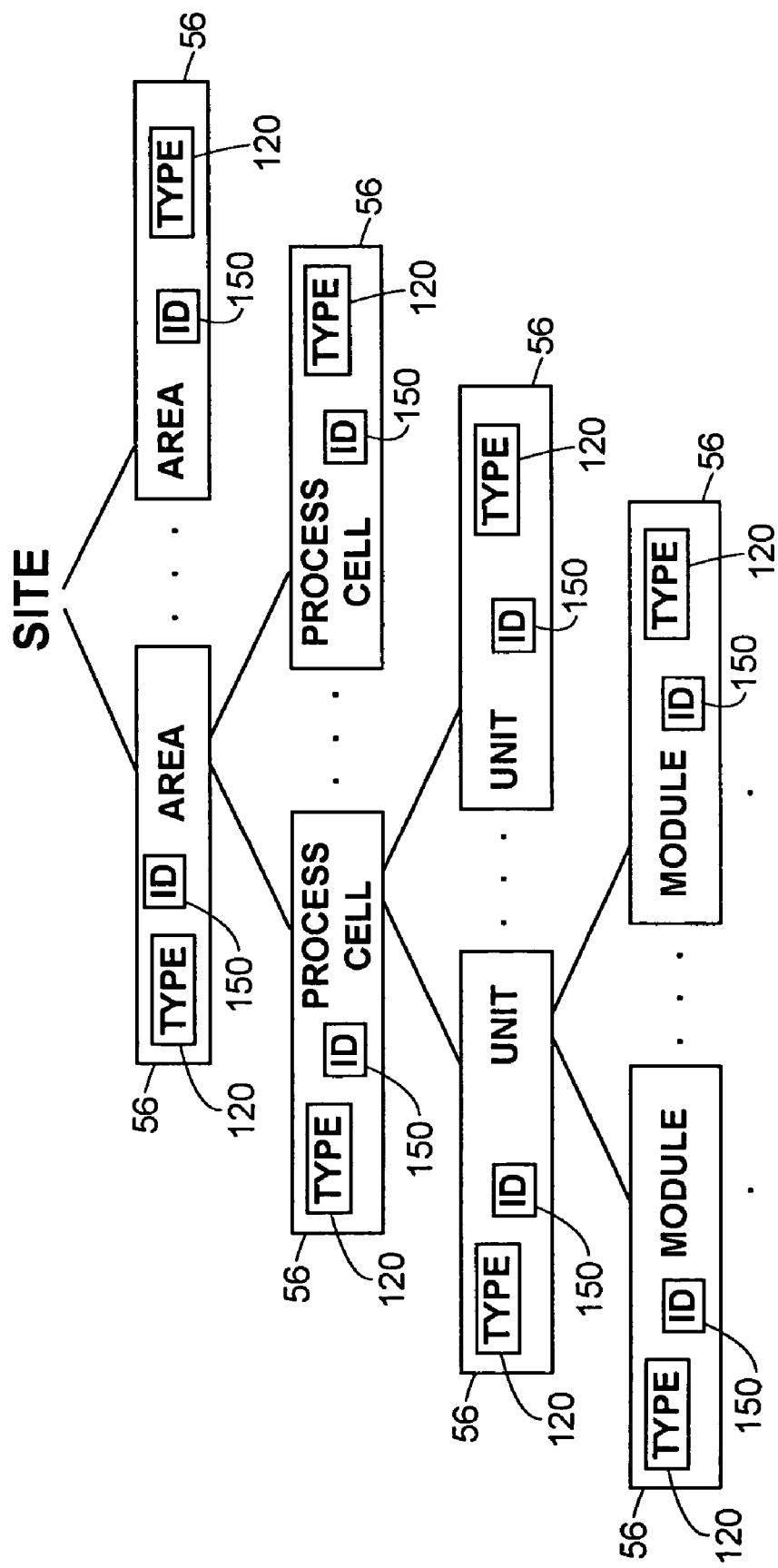
FIG. 3 is a block diagram that illustrates further details of resources associated with the plant with respect to their organization within the plant according one embodiment of the present disclosure.

FIG. 3 is a block diagram that illustrates further details of resources 56 with respect to their organization within plant 50 in one embodiment of the present disclosure. The resources 56 may represent a single item, such as a tank, or a logical grouping of multiple items, such as a tank and a pump, which may include other resources 56. Allowing a single resource 56 to represent or organize other resources 56 allows control of resources 56 in groups. For example, a hierarchy of resources may be created in order to organize plant 50. One embodiment, as illustrated in FIG. 3, organizes resources 56 based on a common organizational system used in the pharmaceutical industry where a given site, such as plant 50, includes one or more areas, such as areas 54, which may each include one or more process cells, which may each include one or more units, which may each include one or more modules representing actual equipment. The resources 56 may further comprise an identifier (id) 150. The id 150 comprises a suitable unique identifier, such as a numeric, alphanumeric or alphabetical value, that distinguishes resources 56 from each other.

FIG. 4 is a block diagram illustrating further details of the batch executive 110 according to one embodiment of the present disclosure. The batch executive 110 may maintain a resource table 200 which maps a resource 56 to its associated type 120 based on the resource's id 150. The resource table 200 may be used by the batch executive 110 to determine whether to send a request for a resource 56 to the LAR 112 or the GAR 114. For example, referring to FIG. 4, the batch executive 110 may use the resource table 200 to determine that a request to use resource Resource2 is to be sent to the GAR 114.

FIG. 5 is a block diagram illustrating details of one embodiment of the GARs 114 that includes voting and voting priorities. The GARs 114 may, in one embodiment, collectively control access to resources 56 through the use of voting, or other suitable techniques, instead of having a particular GAR 114 be solely responsible for a particular set of resources 56. Voting may allow for improved allocation of resources 56, such as allocation based on the needs of the plant 50 globally, instead of a particular area 54. For example, collectively the GARs 114 may have substantially global knowledge of the state of the processes in plant 50 and may use that knowledge to more effectively allocate resources 56. Further, the voting weight of particular GARs 114 may be customized with respect to particular resources 56. A voting table 250 may be used to map the id 150 to a particular GAR 114, such as by using a GAR identifier (GAR id) 260 uniquely associated with a respective GAR 114, and a voting weight 262 for that GAR 114 for that resource 56. For example, referring to FIG. 5, GAR GEA1 may have a voting weight for resource Resource1 of 0.7, while GAR GEA2 has a voting weight of 1.0 for Resource1. The different voting weights may be used to indicate the priority of the GAR 114 with respect to the resource 56 or other suitable criteria.

In one embodiment, a customer GAR 270 could be added to the set of GARs 114 in order to implement customized or other resource allocation schemes. For example, the customer GAR 270 may be configured to allow a plant operator (not shown) to override or veto the other GARs 114 due to the voting weight assigned to the customer GAR 270. The customer GAR 270 may or may not be associated, as suitable, with a particular area 54 or batch executive 110, or have resources 56 directly associated with it.

Figure 6:
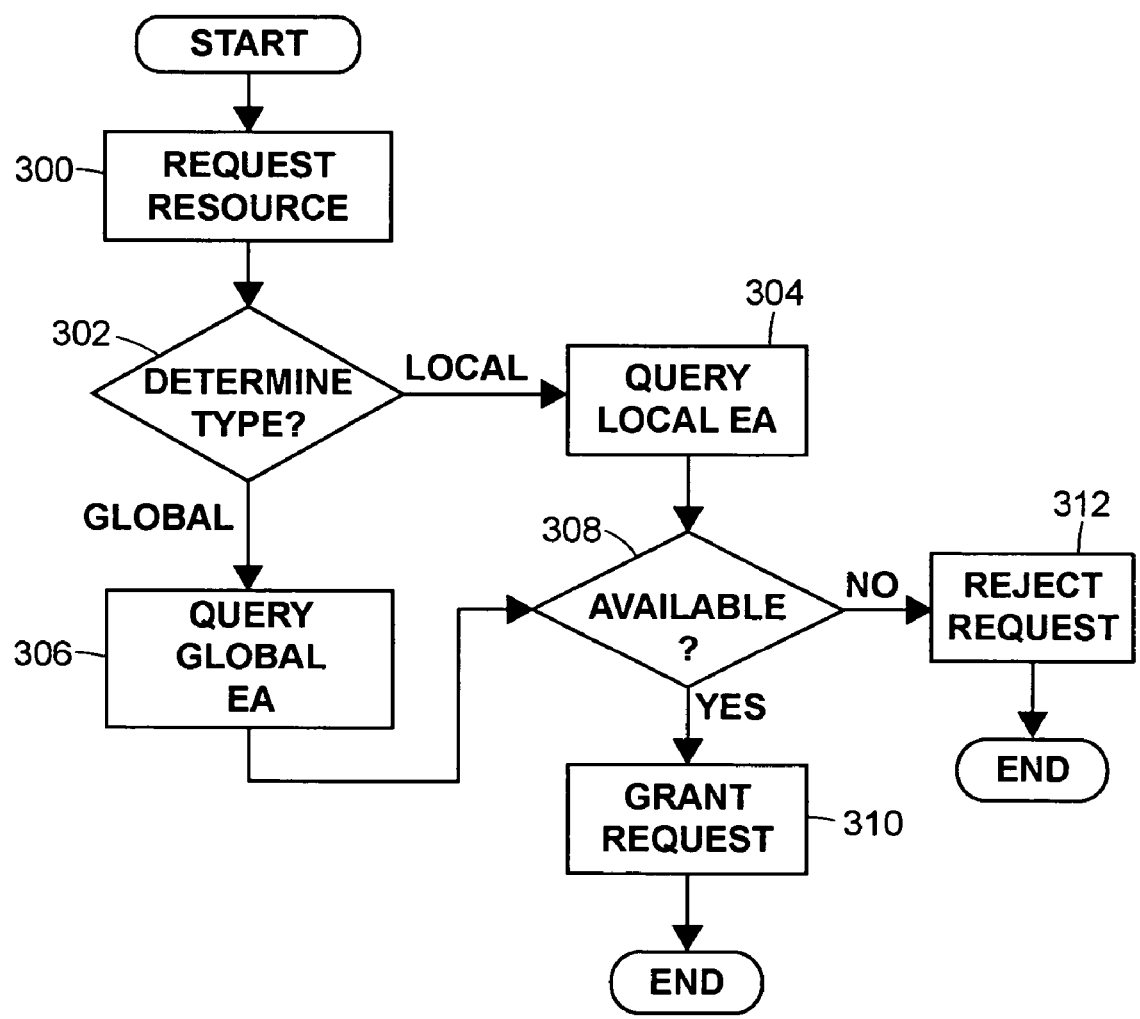
FIG. 6 is a flow chart illustrating the operation of the plant according to one embodiment of the present disclosure.

FIG. 6 is a flow chart illustrating the operation of plant 50 according to one embodiment of the present disclosure. The method begins at block 300 where a request for a resource 56 is received by a batch executive 110 from a resource user 60. Next, at decisional block 302, the batch executive 110 determines whether the type 120 of the requested resource 56 is local or global. If the type 120 of the requested resource 56 is local, then the LOCAL branch of decisional block 302 leads to block 304. At block 304, the batch executive 110 queries the LAR 112 for the batch executive's area 54 to determine whether the requested resource 56 is available. If the type 120 of the requested resource 56 is global, then the GLOBAL branch of decisional block 302 leads to block 306. At block 306, the appropriate GAR 114 for the requested resource 56 is queried and the GAR 114 determines whether the requested resource 56 is available. The GAR 114 may use any suitable technique, either alone or in combination with other GARs 114, to determine whether the requested resource 56 is available.

At decisional block 308, the appropriate LAR 112 or GAR 114 has determined whether the requested resource 56 is available. If the requested resource 56 is available, then the YES branch of decisional block 308 leads to block 310 where the batch executive 110 is informed that the requested resource 56 is available and the batch executive 110 grants access to or allocates the requested resource 56 to the requesting user 60. If the requested resource 56 is not available then the NO branch of decisional block 308 leads to block 312 whether the batch executive is informed that the requested resource 56 is not available and the batch executive 110 denies access to the requested resource 56 to the requesting user 60. The batch executive 110 may take other suitable action upon denial of the request, such as pausing the process of the requesting user 60.

While various methods and procedures have been described in association with the present disclosure, such methods and procedures should not be read to limit or restrict the operation or use of the present disclosure to such methods and procedures. Numerous variations and re-orderings of the methods and procedures described herein may be possible in various embodiments of the present disclosure, and the illustrated flowcharts merely illustrate one possible ordering of the blocks in the flowchart, particular embodiments and implementations may use different orderings as appropriate.

Although certain apparatus constructed in accordance with the teachings of the invention have been described herein, the scope of coverage of this patent is not limited thereto. On the contrary, this patent covers all apparatuses, methods and articles of manufacture of the teachings of the invention fairly, falling within the scope of the appended claims either literally or under the doctrine of equivalents.

What is claimed is:

1. A system for process control equipment arbitration in a process control system, the arbitration system comprising:
   a first batch executive operating on a first node and associated with a first process control area comprising a first set of process control equipment resources, the first batch executive comprising software stored on a computer-readable medium and operable to perform at least a portion of a batch process in the process control system;
   a second batch executive operating on a second node and associated with a second process control area comprising a second set of process control equipment resources, the second batch executive comprising software stored on a computer-readable medium and operable to perform at least a portion of the batch process in the process control system; and
   an arbitration service comprising arbitration software operable to:
      maintain a list of equipment resources, each equipment resource associated with either the first process control area or the second process control area, the use of which equipment resources is arbitrated by the arbitration service;
      receive from a one of the first and second batch executives a request from a user to use a particular equipment resource, the equipment resource located in either the first process control area or the second process control area;
      determine whether the particular equipment resource is available for use by the user; and
      permit or deny the use of the particular equipment resource by the user according to the determination of whether the particular equipment resource is available.

2. The system of claim 1, wherein:
   the arbitration service comprises multiple instances of the arbitration software;
   each of the multiple instances of the arbitration software acts as either a local arbitrator or a global arbitrator;
   each of a first local arbitrator and a first global arbitrator operates on the first node; and
   each of a second local arbitrator and a second global arbitrator operates on the second node.

3. The system of claim 2, wherein each equipment resource is either a local equipment resource or a global equipment resource and further wherein a local equipment resource is available only to users within the same process control area as the local equipment resource, and a global equipment resource is available to users within the same process control area as the global equipment resource and to users within at least one other process control area.

4. The system of claim 3, wherein each local arbitrator arbitrates the use of all local equipment resources within the same process control area as the node on which the local arbitrator operates and each global arbitrator arbitrates the use of all global equipment resources within the same process control area as the node on which the global arbitrator operates.

5. The system of claim 3, wherein:
   each local arbitrator arbitrates requests from users within the same process control area as the node on which the local arbitrator operates, which requests request the use of an equipment resource within the same process control area as the local arbitrator; and
   each global arbitrator arbitrates requests from users in a different process control area as the node on which the global arbitrator operates, which requests request the use of an equipment resource within the same process control area as the global arbitrator.

6. The system of claim 2, wherein determining whether the particular equipment resource is available for use by the user comprises determining by a plurality of global arbitrators whether the particular equipment resource is available.

7. The system of claim 6, wherein determining by a plurality of global arbitrators whether the particular equipment resource is available comprises allowing the plurality of global arbitrators to vote whether the particular equipment resource is available.

8. The system of claim 7, wherein the plurality of global arbitrators have unequal votes.

9. A method for process control equipment arbitration in a process control system, the method comprising:
receiving at an arbitrator, from a batch executive, a request from a user to use a particular equipment resource, wherein:
a first batch executive operates on a first node and is associated with a first process control area comprising a first set of process control equipment resources;
a second batch executive operates on a second node and is associated with a second process control area comprising a second set of process control equipment resources;
the particular requested resource is in either the first set of process control equipment resources or the second set of process control equipment resources; and
each of the first and second batch executives comprise software stored on a computer readable medium and operable to perform at least a portion of the batch process in the process control system;
maintaining in the arbitrator a list of equipment resources arbitrated by the arbitrator, each of the listed equipment resources associated with either the first set of process control equipment resources or the second set of process control equipment resources and;
determining by the arbitrator whether the particular requested equipment resource is available for use by the user;
communicating whether the particular requested equipment resource is available for use by the user; and
permitting or denying the use of the particular requested equipment resource by the user according to the determination by the arbitrator of whether the particular requested equipment resource is available.

10. The method of claim 9, further comprising:
including an arbitrator in each of a plurality of nodes;
communicating between each of the plurality of arbitrators to maintain the same list of equipment resources; and
allowing each arbitrator to arbitrate the use of any equipment resource on the list.

11. The system of claim 10, wherein the process control equipment resources within a one of the first process control area and the second process control area are organized hierarchically.

12. The method of claim 9, further comprising:
including one or more arbitrators at each of a plurality of nodes; and
arranging each of the plurality of arbitrators to act as either a local arbitrator or a global arbitrator;
wherein each of the first and second nodes includes two arbitrators, one of which acts as a local arbitrator and one of which acts as a global arbitrator.

13. The method of claim 12, further comprising:
arranging each equipment resource to be either a local equipment resource or a global equipment resource, wherein a local equipment resource is available only to users within the same process control area as the local equipment resource, and a global equipment resource is available to users within the same process control area as the global equipment resource and to users within at least one other process control area.

14. The method of claim 13, further comprising:
using a particular local arbitrator to arbitrate the use of all local equipment resources within the same process control area as the node on which the particular local arbitrator operates; and
using a particular global arbitrator to arbitrate the use of all global equipment resources within the same process control area as the node on which the particular global arbitrator operates.

15. The method of claim 13, further comprising:
using a particular local arbitrator to arbitrate requests from users within the same process control area as the node on which the particular local arbitrator operates, which requests request the use of an equipment resource within the same process control area as the particular local arbitrator; and
using a particular global arbitrator to arbitrate requests from users in a different process control area as the node on which the particular global arbitrator operates, which requests request the use of an equipment resource within the same process control area as the particular global arbitrator.

16. The method of claim 12, wherein determining whether the particular requested equipment resource is available for use by the user further comprises determining by a plurality of global arbitrators whether the particular requested equipment resource is available.

17. The method of claim 16, wherein determining by a plurality of global arbitrators whether the particular requested equipment resource is available comprises allowing the plurality of global arbitrators to vote whether the particular requested equipment resource is available.

18. The method of claim 12, wherein the batch executive that sends the request to a particular arbitrator operates on a different node than the particular arbitrator receiving the request.

19. The method of claim 12, wherein receiving the request from a user to use a particular equipment resource further comprises:
receiving the request at a one of the first batch executive and the second batch executive;
selecting, by the one of the first batch executive and the second batch executive, a particular local arbitrator or a particular global arbitrator to handle the request; and
sending the request to the selected local or global arbitrator.

20. The method of claim 19, further comprising arranging each equipment resource to be either a local equipment resource or a global equipment resource, and wherein selecting a particular local arbitrator or a particular global arbitrator further comprises selecting a particular local arbitrator or a particular global arbitrator based on whether the requested equipment resource is a local equipment resource or a global equipment resource.

21. The method of claim 19, further comprising arranging each equipment resource to be either a local equipment resource or a global equipment resource, and wherein selecting a particular local arbitrator or a particular global arbitrator further comprises selecting a particular local arbitrator or a particular global arbitrator based on the resource location relative to the one of the first batch executive and the second batch executive that receives the request.

22. The method of claim 9, further comprising:
including a plurality of arbitrators;
selecting a first of the plurality of arbitrators as a master arbitrator;
receiving at the master arbitrator the request to use the particular equipment resource;

selecting, by the master arbitrator, a one of the plurality of arbitrators; and handling the request by the selected arbitrator.

23. A system for process control equipment arbitration in a process control system, the arbitration system comprising:

software encoded on a computer readable medium, the software operable to instantiate one or more arbitrators, each arbitrator operable to:

receive from a batch executive a request from a user to use a particular equipment resource, wherein:

a first batch executive operates on a first node and is associated with a first process control area comprising a first set of process control equipment resources;

a second batch executive operates on a second node and is associated with a second process control area comprising a second set of process control equipment resources;

the particular requested resource is in either the first set of process control equipment resources or the second set of process control equipment resources; and each of the first and second batch executives comprise software stored on a computer readable medium and operable to perform at least a portion of the batch process in the process control system;

maintain a list of equipment resources arbitrated by the arbitrator, each of the listed resources associated with either the first process control area or the second process control area;

determine whether the particular requested equipment resource is available for use by the user;

communicate whether the particular requested equipment resource is available for use by the user; and permit or deny the use of the particular requested equipment resource by the user according to the determination of whether the particular requested equipment resource is available.

24. The system of claim 23, wherein:

a first of the one or more arbitrators operates on the first node;

others of the one or more arbitrators operate on each of a plurality of nodes distinct from the first node;

the one or more arbitrators communicate with each other to maintain the same list of equipment resources; and each of the one or more arbitrators is operable to arbitrate the use of any equipment resource on the list.

25. The system of claim 24, wherein:

the first of the one or more arbitrators acts as a master arbitrator for the first batch executive; and a second of the one or more arbitrators operates on the second node and acts as a master arbitrator for the second batch executive.

26. The system of claim 24, wherein any of the one or more arbitrators queries others of the one or more arbitrators prior to permitting or denying the use of the particular requested equipment resource.

27. The system of claim 23, wherein:

a first of the one or more arbitrators operates on the first node;

others of the one or more arbitrators operate on each of a plurality of nodes distinct from the first node;

each of the one or more arbitrators acts as either a local arbitrator or a global arbitrator; and each of the first and second nodes includes two of the one or more arbitrators, one of which acts as a local arbitrator and one of which is acts a global arbitrator.

28. The system of claim 27, wherein:

each equipment resource is either a local equipment resource or a global equipment resource; and further wherein:

local equipment resources are available only to users within the same process control area as the local equipment resource; and global equipment resources are available to users within the same process control area as the global equipment resource and to users within at least one other process control area.

29. The system of claim 28, wherein:

a particular local arbitrator arbitrates the use of all local equipment resources within the same process control area as the node on which the particular local arbitrator operates; and a particular global arbitrator arbitrates the use of all global equipment resources within the same process control area as the node on which the particular global arbitrator operates.

30. The system of claim 28, wherein:

a particular local arbitrator arbitrates requests from users within the same process control area as the node on which the particular local arbitrator operates, which requests request the use of an equipment resource within the same process control area as the particular local arbitrator; and a particular global arbitrator arbitrates requests from users in a different process control area as the node on which the particular global arbitrator operates, which requests request the use of an equipment resource within the same process control area as the particular global arbitrator.

31. The system of claim 27, wherein determining whether requested the particular equipment resource is available for use by the user further comprises determining by a plurality of global arbitrators whether the particular requested equipment resource is available.

32. The system of claim 31, wherein determining by a plurality of global arbitrators whether the particular requested equipment resource is available comprises allowing the plurality of global arbitrators to vote whether the particular requested equipment resource is available.

33. The system of claim 32, wherein the plurality of global arbitrators have unequal votes.

34. The system of claim 27, wherein the batch executive that sends the request to a particular arbitrator operates on a different node than the particular arbitrator receiving the request.

35. The system of claim 27, wherein receiving the request from a user to use a particular equipment resource further comprises:

receiving the request at a one of the first batch executive and the second batch executive;

selecting, by the one of the first batch executive and the second batch executive, a particular local arbitrator or a particular global arbitrator to handle the request; and sending the request to the selected local or global arbitrator.

36. The system of claim 35, wherein each equipment resource is either a local equipment resource or a global equipment resource, and wherein selecting a particular local arbitrator or a particular global arbitrator further comprises selecting a particular local arbitrator or a particular global arbitrator based on whether the requested equipment resource is a local equipment resource or a global equipment resource.

37. The system of claim 35, wherein each equipment resource is either a local equipment resource or a global equipment resource, and wherein selecting a particular local arbitrator or a particular global arbitrator further comprises selecting a particular local arbitrator or a particular global arbitrator based on the resource location relative to the one of the first batch executive and the second batch executive that receives the request.

38. The system of claim 27, wherein upon a failure of a first global arbitrator, a second global arbitrator is operable to arbitrate the use of resources arbitrated by the first global arbitrator prior to the failure.

39. The system of claim 23, wherein the process control equipment resources within a one of the first process control area and the second process control area are organized hierarchically.

40. The system of claim 23, wherein the software is further operable to:

select a first of the one or more arbitrators as a master arbitrator;

receive at the master arbitrator the request to use the particular equipment resource;

select, by the master arbitrator, a one of the one or more arbitrators; and handle the request by the selected arbitrator.

* * * * *

UNITED STATES PATENT AND TRADEMARK OFFICE
CERTIFICATE OF CORRECTION

PATENT NO. : 7,680,970 B2
APPLICATION NO. : 10/972192
DATED : March 16, 2010
INVENTOR(S) : Godfrey R. Sherriff et al.

It is certified that error appears in the above-identified patent and that said Letters Patent is hereby corrected as shown below:

In the Specification:

At Column 1, line 62, "a : process" should be -- a process --.

At Column 7, line 13, "the:requesting" should be -- the requesting --.

Signed and Sealed this

Twenty-first Day of September, 2010

David J. Kappos
*Director of the United States Patent and Trademark Office*